United States Patent [19]
Dion

[11] Patent Number: 5,575,453
[45] Date of Patent: Nov. 19, 1996

[54] VEHICLE SIDEWALL AIR DISTRIBUTION DUCT WITH INFLATABLE GASKET

[75] Inventor: Jean-Pierre Dion, Fouras, France

[73] Assignee: GEC Alsthom Transport SA, Paris, France

[21] Appl. No.: 441,437

[22] Filed: May 15, 1995

[30] Foreign Application Priority Data

May 26, 1994 [FR] France .................... 94 06383

[51] Int. Cl.⁶ .................................................. F16K 7/10
[52] U.S. Cl. .......................................... 251/61.1; 454/108
[58] Field of Search .......................... 251/61.1; 454/108, 454/288

[56] References Cited

U.S. PATENT DOCUMENTS

| | | |
|---|---|---|
| 2,874,925 | 2/1959 | Stafford . |
| 2,984,448 | 5/1961 | Koplin . |
| 4,135,698 | 1/1979 | Thate et al. .............. 251/61.1 |
| 4,399,739 | 8/1983 | Dean ..................... 251/61.1 X |
| 4,706,738 | 11/1987 | Heimbrodt et al. ........ 251/61.1 X |

FOREIGN PATENT DOCUMENTS

| | | |
|---|---|---|
| 0234297A1 | 9/1987 | European Pat. Off. . |
| 1222483 | 6/1960 | France . |
| 2601310A1 | 7/1977 | Germany . |
| 2123947 | 2/1984 | United Kingdom . |
| 2156067 | 10/1985 | United Kingdom . |

Primary Examiner—John C. Fox
Attorney, Agent, or Firm—Sughrue, Mion, Zinn, Macpeak & Seas

[57] ABSTRACT

The present invention relates to a shutter device for shutting off a distribution duct, said device being wherein it is composed of at least one longitudinally-extending means that is/are inflatable. The present invention also relates to use of longitudinally-extending inflatable means to constitute a shutter device. The present invention also relates to a ventilation and air-conditioning installation including such a shutter device.

6 Claims, 3 Drawing Sheets

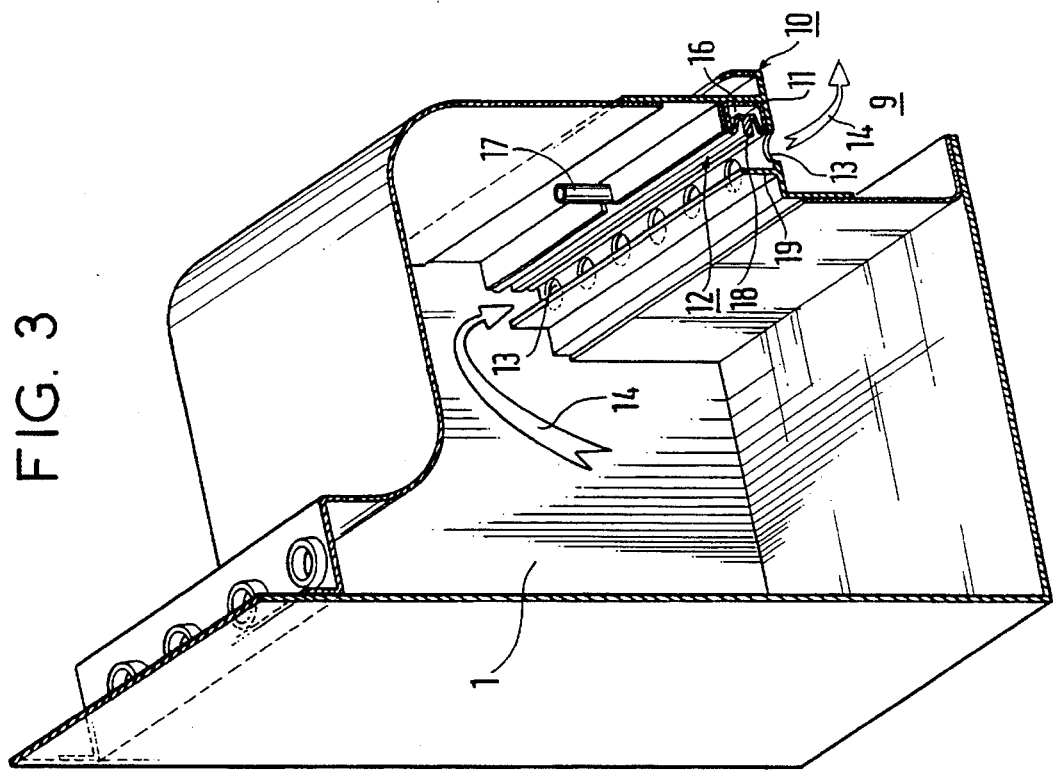
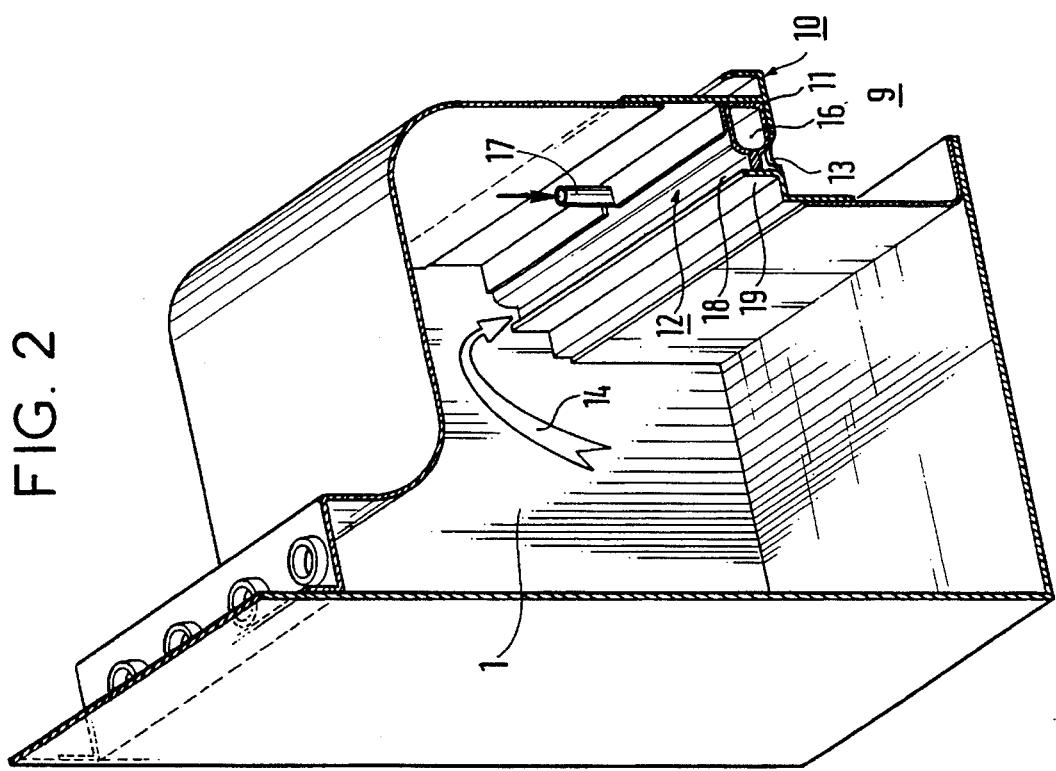

5,575,453

VEHICLE SIDEWALL AIR DISTRIBUTION DUCT WITH INFLATABLE GASKET

FIELD OF THE INVENTION

The present invention relates generally to ventilation or air-conditioning installations for vehicles, especially rail vehicles or road vehicles, and it relates more particularly to a shutter device for shutting off a distribution duct, and to an installation including such a device.

In other words, the present invention relates to a shutter device for shutting off a flow of conditioned air blown out at floor level.

BACKGROUND OF THE INVENTION

State-of-the-art documents disclose ventilation or air-conditioning installations for vehicles, especially rail vehicles and road vehicles, which installations include shutter devices for shutting off air-conditioning ducts.

Document FR 2 461 606 (1979) to AIR INDUSTRIE and to SOCIETE NATIONALE DES CHEMINS DE FER FRANCAIS describes an air-conditioning installation for a public transport vehicle. That installation includes air-conditioning means for feeding a distribution duct under pressure, first localized distribution devices interconnected with one another permanently via said distribution duct, and second localized distribution devices, each of which is fed intermittently also from said distribution duct.

That document teaches that a shutter member controlled by control means can be used to enable the localized distribution devices to be shut off.

That shutter member is constituted by a valve member formed by a metal disk and by a disk made of a soft material for leak-proofing the valve on closure.

Such an air-conditioning installation suffers from the drawbacks that the flexible means implemented are bulky, noisy, and tend to become worn.

Such shutter members also suffer from the drawbacks of being costly, and fragile, and of preventing the distribution duct in which they are installed from being cleaned easily and quickly.

Another drawback of such prior art shutter members is that they are difficult to replace.

Another drawback of those prior art shutter members is that they distribute the air intermittently, whereas the device of the invention by the Applicant applies to continuous distribution which improves comfort.

Another drawback of those prior art shutter members is that electrical or pneumatic power must be supplied to each shutter member.

Document EP 0 315 108 (1987) to HITACHI describes a ventilation installation for rolling stock. That installation includes air feed means for sucking in air from outside a vehicle and feeding it into said vehicle, and exhaust means for exhausting the air from the inside of the vehicle to the outside thereof.

That document teaches that flexible means in the form of plates can be used for reducing the cross-sectional areas of the respective air-flow passages as a function of changes in the pressure of the outside air.

Such a ventilation installation and such shutter means suffer from the above-mentioned drawbacks.

Document FR 2 693 698 (1992) to the Applicant concerns air-conditioning apparatus enabling sudden changes in the pressure inside the vehicles to be avoided.

That air-conditioning apparatus includes, inter alia, shutter means for shutting off the pipes via which outside air is sucked in, and inside air is rejected.

Those shutter means are constituted by flaps matching the dimensions of the pipes. They are disposed in the vicinity of the inlet and of the outlet of the air-conditioning apparatus. They are mounted to swing about respective arms secured to one of their sides, by means of hinge systems associated with the walls of the pipes. The arms are rotated by respective actuators fixed to the structure of the vehicle.

Unfortunately, such air-conditioning apparatus and such shutter means do not enable the above-mentioned drawbacks to be remedied.

State-of-the-art documents also disclose shutter devices that can be applied to ventilation or air-conditioning installations for vehicles, especially rail vehicles and road vehicles.

Documents EP 0 523 752 (1987) and EP 0 315 108 (1987), both to HITACHI, describe an air-flow regulation device placed in the ventilation circuit of a rail vehicle, for regulating the air-flow when the vehicle is in motion, the vehicle including at least one pipe putting the air contained inside the vehicle into communication with the air outside the vehicle. That device includes means for preventing or limiting air flow through the pipe in the event of a sudden change between the pressure outside the vehicle and the pressure inside said vehicle.

As indicated above, such a ventilation installation and such shutter means suffer from the above-defined drawbacks.

State-of-the-art documents also disclose other shutter devices that might be applied to ventilation or air-conditioning installations for vehicles, especially for rail vehicles or road vehicles.

Document DE 371 783 (1923) to SILLER & BODENKIRCHEN describes shutter means comprising two shutter elements, each of which is formed by a part that fits snugly inside a pipe, and that is provided with a through aperture via which air can flow, the aperture opening out in a partition-receiving face of the part, the partition-receiving faces of the two elements facing each other, the partition being a blade that is fixed via one of its sides, and that, in the event of a sudden change between the pressure inside the vehicle and the pressure outside said vehicle, is capable of being pressed against the partition-receiving face of one of the shutter elements so as to close its aperture entirely in the event of pressure change in a given direction, and of being pressed against the partition-receiving face of the other shutter element so as to close its aperture in the event of pressure change in the other direction.

Document U.S. Pat. No. 3,260,274 (1966) to J. P. MORGAN describes a valve comprising:

at least one shutter element A, B disposed inside a pipe so as to leave a passage through which a flow can pass, the shutter element having a "partition-receiving" face; and at least one partition disposed transversely relative to the flow, and situated in the vicinity of the partition-receiving face 15, 16 of the shutter element A, B, the partition being deformable under pressure.

In the event that the inside pressure and the outside pressure are equal, the partition leaves an unobstructed flow passage, and in the event of sudden change between the inside pressure and the outside pressure, the partition is pressed against said partition-receiving face so as to shut off the flow passage.

Document U.S. Pat. No. 3,260,274 to J. P. MORGAN also discloses that the valve comprises two shutter elements A & B, each of which is formed by a part that fits snugly into a pipe, and that is provided with a through aperture via which a flow can pass. The partition-receiving face of each of the elements, in which face the aperture opens out, is a concave face, the partition-receiving faces of the two shutter elements facing each other. The partition is a blade hinged via two opposite ones of its sides and situated between the two partition-receiving faces, the blade having a rest position between the two partition-receiving faces in the event that the pressure inside the vehicle is equal to the pressure outside said vehicle, and being pressed against one or other of the partition-receiving faces in the event of sudden change between the pressure inside the vehicle and the pressure outside said vehicle.

Document CH 492 910 (1968) to BATELLE MEMORIAL INSTITUTE describes a shutter element that may be a part that fits snugly inside a pipe, and that is provided with a through aperture via which air can flow. The partition-receiving face of the element, in which face the aperture opens out, is a concave face, the partition being a blade hinged via two opposite ones of its sides.

The shutter devices described in the last-mentioned documents suffer from the drawbacks of being complex and fragile.

Moreover, the shutter devices described in said last-mentioned documents suffer from the major drawback of only enabling a distribution duct to be shut off locally and to a limited extent, and therefore of only being usable at the inlet or at the outlet of the distribution duct.

OBJECTS AND SUMMARY OF THE INVENTION

The present invention enables all of these drawbacks to be remedied simply and cheaply.

An object of the invention is to provide a shutter device for shutting off a distribution duct, the device making it possible to improve the atmospheric comfort in the various areas or compartments that are occupied by passengers or staff on board a rail vehicle or a road vehicle.

The invention provides a shutter device for shutting off a distribution duct, wherein the shutter device is composed of longitudinally-extending means that are inflatable.

The shutter device of the invention for shutting off a distribution duct has at least one of the following characteristics:

- each of the longitudinally-extending inflatable means is in the form of a hollow flexible longitudinal strip that is closed at both of its ends so as to constitute a chamber, and that is provided with an air inlet/outlet orifice;
- each of the longitudinally-extending inflatable means is in the form of a succession of hollow flexible longitudinal strip segments, each of which is closed at both of its ends so as to constitute a chamber, and is provided with a respective air inlet/outlet orifice; and
- each of the longitudinally-extending inflatable means is provided, on its side that is perpendicular to the floor-ward-facing blow perforations, with an outwardly-extending projection designed to co-operate with the extrusion so as to come into close contact with a facing portion of the extrusion.

The invention also provides use of longitudinally-extending inflatable means to constitute a shutter device, in particular for shutting off a distribution duct.

The invention also provides a ventilation or air-conditioning installation including treated air feed means for feeding treated air into a vehicle by means of a shutter device for shutting off a distribution duct, wherein the shutter device is composed of longitudinally-extending inflatable means.

An advantage of the shutter device of the invention for shutting off a distribution duct is that it is reliable because it has no wear parts.

Another advantage of the shutter device of the invention for shutting off a distribution duct is that its overall size is small compared with its ability to shut off a distribution duct over the entire length thereof.

Another advantage of the shutter device of the invention for shutting off a distribution duct is that it operates quietly.

Another advantage of the shutter device of the invention for shutting off a distribution duct is that it is easy to maintain and, in particular, it makes the inside of the distribution duct easy to clean.

Another advantage of the shutter device of the invention for shutting off a distribution duct is that it is cheap.

Another advantage of the shutter device of the invention for shutting off a distribution duct is that it makes it possible to reduce the blow flow-rate, without shutting it off entirely, by reducing the air pressure in the inflatable element.

BRIEF DESCRIPTION OF THE DRAWINGS

Other objects, characteristics, and advantages of the invention will appear on reading the following description of a preferred embodiment of the shutter device for shutting off a distribution duct, given with reference to the accompanying drawings, in which:

FIG. 2 shows the shutter device shown in FIG. 1 for shutting off a distribution duct, with the device being in a position such that it shuts off the distribution duct;

FIG. 3 shows the FIG. 1 shutter device for shutting off a distribution duct, with the device being in a position such that it does not shut off the distribution duct.

MORE DETAILED DESCRIPTION

Figure 1:
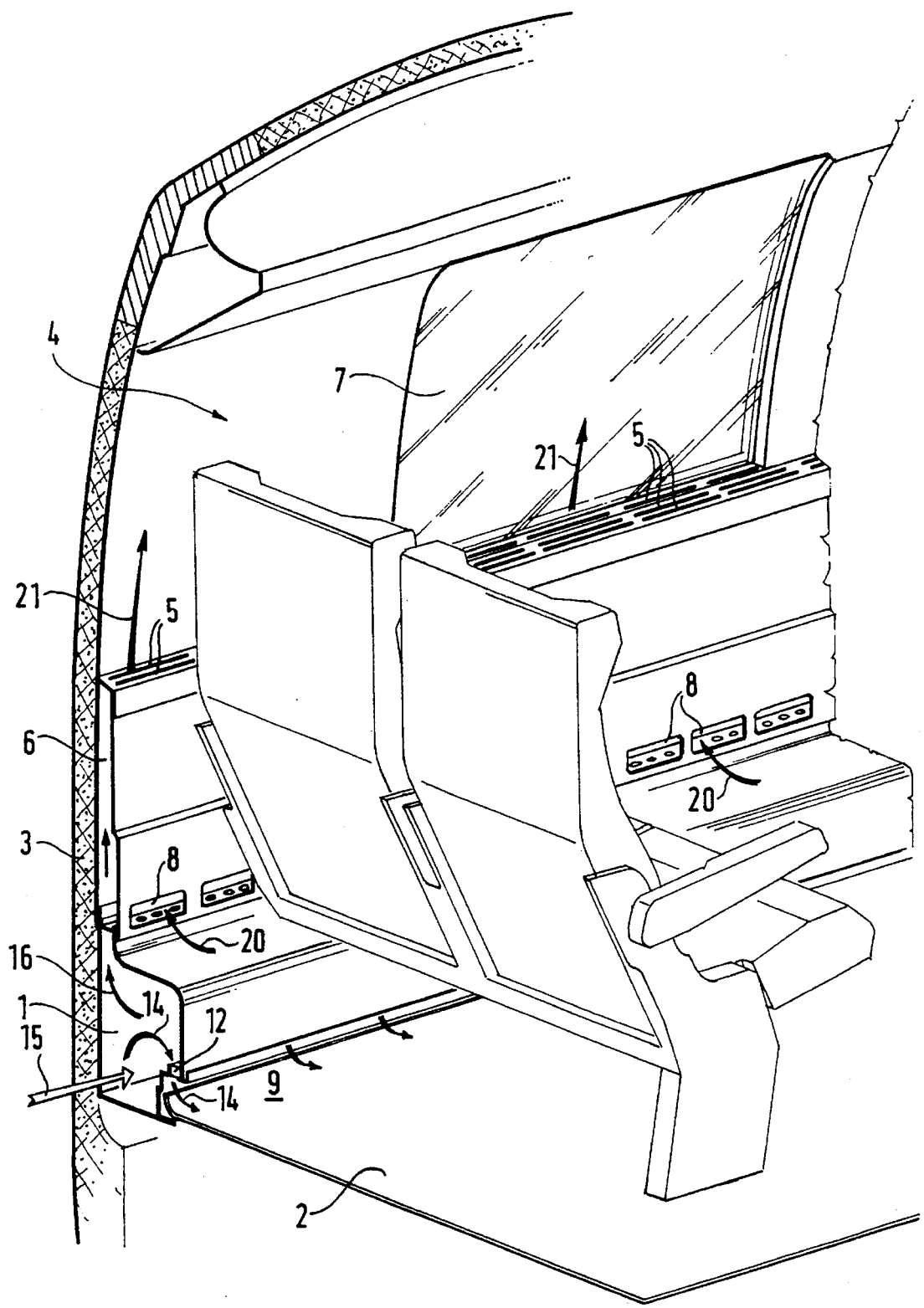
FIG. 1 is a perspective view of the inside of a rail vehicle provided with a ventilation or air-conditioning installation of the invention, in which installation the treated air is distributed via distribution ducts situated at floor level.

FIG. 1 is a view in radial section of a rail vehicle whose walls are provided with the shutter device 12 of the invention for shutting off a distribution duct.

The treated air is produced by an air-conditioning installation (not shown), and it is distributed to the various areas and compartments inside of the vehicle via distribution ducts 1.

Generally, the distribution ducts 1 are situated on the floor 2, along the walls 3 of the vehicle 4.

The air is blown out via vents 5 in the top 6 of the distribution duct 1 and/or via an opening 9 provided at the base of the distribution duct 1 and aimed at the floor 2.

In accordance with a first principle, a first portion 16 of the treated air 15 is blown via vents 5 situated in the top 6 of the distribution duct 1.

The vents 5 in the top 6 of the distribution duct 1 are located in groups under windows 7.

In the embodiment shown in FIG. 1, the groups of vents 5 in the top portion 6 of the distribution duct 1 are spaced apart over the entire length of the vehicle so as to co-operate with "induction" ports 8.

The purpose of the induction ports 8 is to create induction of the air 20 in the vehicle, and to mix it with the first portion 16 of the treated air 15.

This mixture 21 is then blown out at the base of each window 7.

In accordance with a second principle, the second portion 14 of the treated air 15 flows out at the feet of passengers via orifices 13 provided at the base of the distribution duct 1 and aimed at the floor 2.

By diffusing air towards the floor 2, heating comfort is improved because the diffusion accelerates heating at floor level.

Such diffusion is required by the most-recent rail standards which specify low vertical temperature variation in the passenger volume.

However, blowing air out at floor level can be a source of discomfort for the feet and ankles of passengers, when the temperature of the blown air decreases, in particular during cooling.

The principle of the shutter device of the invention consists in shutting off at will the flow of air blown floorwards, by means of a system that does not involve using wear parts that might, over time, jam, e.g. because of condensation or of heat exchange in the network of distribution ducts.

FIGS. 2 and 3 show the shutter device shown in FIG. 1 for shutting off a distribution duct, with the device being respectively in a position such that it shuts off the distribution duct, and in a position such that it does not shut off the distribution duct.

As in the preferred embodiment shown in FIG. 1, FIGS. 2 and 3 show a rigid aluminum extrusion 10 provided with floorward-facing blow perforations 13 and with a rabbet 11 extending along its entire length. This rabbet is used to receive the shutter device 12.

An longitudinally-extending inflatable gasket constituting the shutter device 12 is, for example, glued at its base inside the rabbet 11 of the extrusion 10.

The longitudinally-extending inflatable gasket 12 is in the form of a hollow flexible longitudinal strip that is closed at both of its ends so as to constitute a chamber 16, and that is provided with an air inlet/outlet orifice 17.

Preferably, on its side that is perpendicular to the floorward-facing blow perforations 13, the longitudinally-extending inflatable gasket 12 is provided with an outwardly-extending projection 18 designed to cooperate with the extrusion 10 so as to come into close contact with a facing portion 19 of the extrusion 10.

The longitudinally-extending inflatable gasket may also be in the form of a succession of hollow flexible longitudinal strip segments, each of which is closed at both of its ends so as to constitute a chamber, and is provided with a respective air inlet/outlet orifice.

In the embodiment, the longitudinally-extending inflatable gasket is capable of being fed with compressed air, e.g. with air that has expanded to the pressure in use.

By inflating, the longitudinally-extending inflatable gasket obstructs the floorward-facing blow perforations 13.

The longitudinally-extending inflatable gasket may also not be fed with air. In which case, the longitudinally-extending inflatable gasket retracts to its initial rest-state volume, and uncovers the floorward-facing blow perforations 13 so as to enable the second portion 14 of the treated air 15 to pass therethrough, thereby enabling the air to be blown towards the floor 2.

Figure 4:
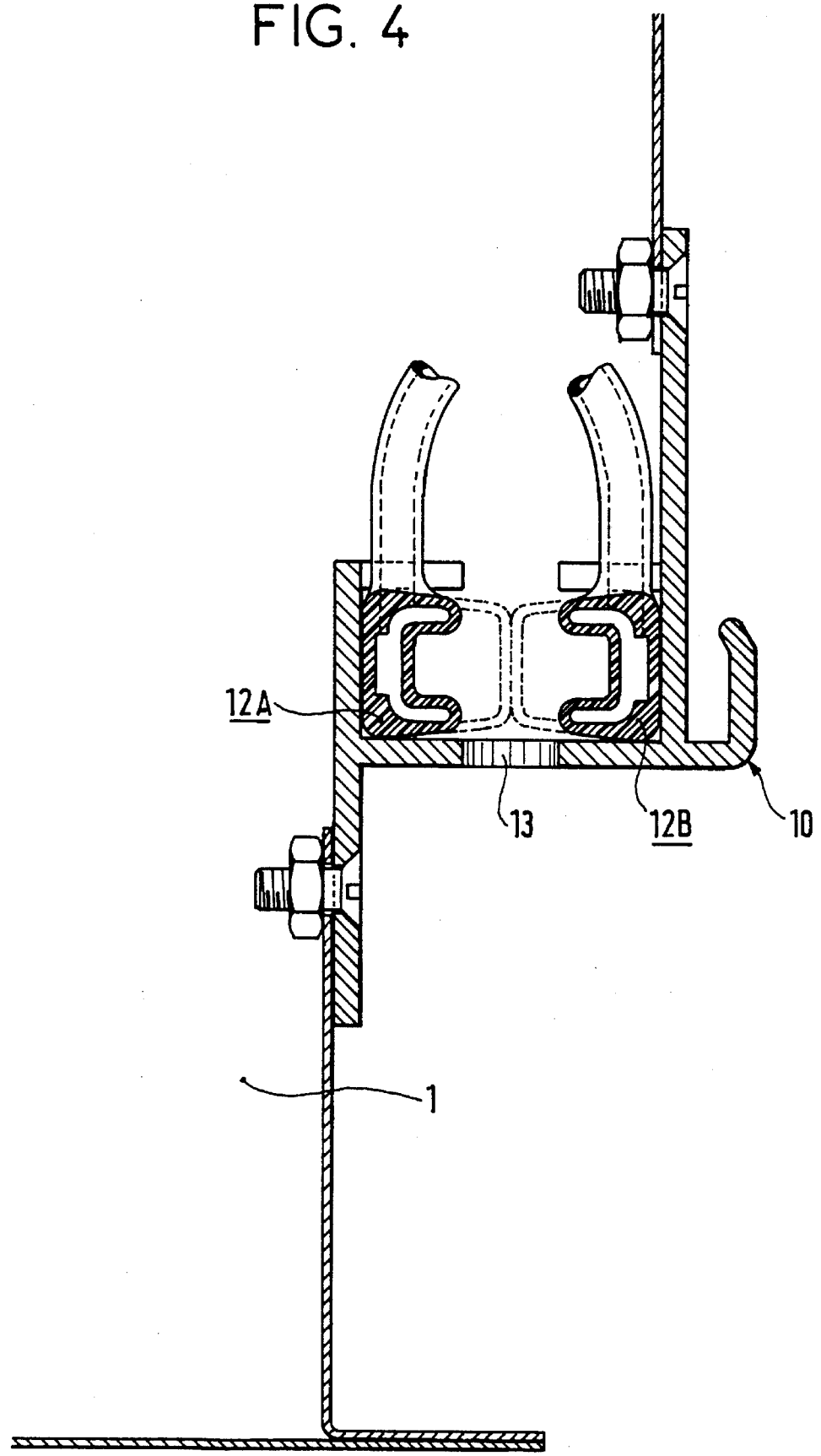
FIG. 4 shows another embodiment of the shutter device for shutting off a distribution duct.

FIG. 4 shows another embodiment of the shutter device for shutting off a distribution duct.

As shown in FIG. 4, the shape of the extrusion 10 is modified so as to enable two longitudinally-extending inflatable means (12A, 12B) to be held.

In this preferred embodiment of the shutter device for shutting off a distribution duct, the two longitudinally-extending inflatable means (12A, 12B) are disposed head-to-tail.

Such a configuration offers the advantage of enabling the stroke of each of the longitudinally-extending inflatable means to be reduced.

The shutter device of the invention makes it simple to shut off a continuous-flow blow orifice of unlimited length extending over the length of the area or compartment.

The shutter device of the invention is also applicable to intermittent flow.

When it is in the heating mode, the shutter device of the invention also offers the advantage of making it possible to modulate the flow-rate, and to increase or decrease the flow-rate and the speed of the air blown out under the windows.

Another advantage is that the pre-conditioning time is reduced.

The air-conditioning installation is pre-conditioned before the passengers board the vehicle so as to make the inside temperature pleasant.

Such pre-cooling or pre-heating may integrate the flow via the floorward-facing blow perforations, thereby enabling the air to be mixed better, so that the temperature is made more homogeneous, in a shorter time.

I claim:

1. For a vehicle having laterally opposed, generally vertical sidewalls and an underlying integral floor, an air distribution duct being of modified rectangular cross-section and extending longitudinally along the floor of the vehicle and along one sidewall thereof, said air distribution duct having vertically opposed top and bottom walls and horizontally opposed sidewalls including a laterally outer sidewall proximate to said vehicle sidewall and a spaced, laterally opposed sidewall facing interiorly of the vehicle, said duct including a narrow top extending vertically upward along said exteriorly facing sidewall, said interiorly facing sidewall of said duct being laterally offset adjacent said floor including a short height vertical portion and a right angle horizontal portion defining a recess within the interiorly facing sidewall, a longitudinally extending series of floorward-facing blow perforations within said horizontal portion for permitting air distributed through said duct to enter the interior of the vehicle adjacent to said floor, at least one longitudinally extending inflatable gasket within the interior of the duct adjacent the interiorly facing sidewall and parallel to said series of perforations and including a normally retractable portion in the non-inflated state retracted to one side of the perforations, but projectable across the perforations to seal off the flow of air through said floorward-facing blow perforations to limit distribution of air within said duct to said narrow top portion along the vehicle sidewall.

2. The air distribution duct as claimed in claim 1, wherein a C-shaped rabbit is provided interiorly of said duct to one side of said series of perforations, and wherein said duct includes a vertically upright wall integral with said duct, extending longitudinally along the side of said perforations opposite that of said rabbit and facing the same, and wherein said longitudinally extending inflatable gasket is fixedly mounted within said rabbit, and said retractable portion of said gasket includes a horizontal projection sized such that, with said inflatable gasket under inflation, said integral horizontal projection abuts said vertical wall to seal off the flow of air between said rabbit and said vertical wall to prevent ventilating air passing from the interior of said duct through said perforations and along the surface of said floor interiorly of the vehicle.

3. The air distribution duct as claimed in claim 2, wherein said narrow top of said duct extends vertically some distance from the top wall of said duct along said one sidewall of said vehicle and terminates in vents opening to the interior of the vehicle, and wherein said narrow top of said duct includes air induction ports within a sidewall thereof opening interiorly to said vehicle such that ventilating air moving upwardly from said duct chamber through said narrow top causes induction of air from the interior of the vehicle through said induction ports, with a mixture of the inducted air and the ventilation air escaping through said vents back into the interior of the vehicle at some distance above the induction ports.

4. The air distribution duct as claimed in claim 1, wherein a pair of oppositely facing open-sided C-shaped rabbits is mounted to said duct on the interior thereof and extends longitudinally to opposite sides of said series of perforations over the length of said duct, and wherein said at least one longitudinally extending inflatable gasket comprises a pair of gaskets respectively fixedly mounted within said rabbits and having laterally projecting portions extendable towards each other for contact therebetween upon inflation of said gaskets to seal off said series of perforations.

5. The air distribution duct as claimed in claim 4, wherein said narrow top of said duct extends vertically some distance from the top wall of said duct along said one sidewall of said vehicle and terminates in vents opening to the interior of the vehicle, and wherein said narrow top of said duct includes air induction ports within a sidewall thereof opening interiorly to said vehicle such that ventilating air moving upwardly from said duct chamber through said narrow top causes induction of air from the interior of the vehicle through said induction ports, with a mixture of the inducted air and the ventilation air escaping through said vents back into the interior of the vehicle at some distance above the induction ports.

6. The air distribution duct as claimed in claim 1, wherein said narrow top of said duct extends vertically some distance from the top wall of said duct along said one sidewall of said vehicle and terminates in vents opening to the interior of the vehicle, and wherein said narrow top of said duct includes air induction ports within a sidewall thereof opening interiorly to said vehicle such that ventilating air moving upwardly from said duct chamber through said narrow top causes induction of air from the interior of the vehicle through said induction ports, with a mixture of the inducted air and the ventilation air escaping through said vents back into the interior of the vehicle at some distance above the induction ports.

* * * * *